(12) United States Patent
Yoo et al.

(10) Patent No.: US 11,263,744 B2
(45) Date of Patent: Mar. 1, 2022

(54) SALIENCY MAPPING BY FEATURE REDUCTION AND PERTURBATION MODELING IN MEDICAL IMAGING

(71) Applicant: Siemens Healthcare GmbH, Erlangen (DE)

(72) Inventors: Youngjin Yoo, Princeton, NJ (US); Pascal Ceccaldi, Princeton, NJ (US); Eli Gibson, Plainsboro, NJ (US); Mariappan S. Nadar, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 92 days.

(21) Appl. No.: 16/707,209

(22) Filed: Dec. 9, 2019

(65) Prior Publication Data
US 2021/0174497 A1    Jun. 10, 2021

(51) Int. Cl.
*G06K 9/00* (2006.01)
*G06T 7/00* (2017.01)
*G06K 9/46* (2006.01)
*G06K 9/62* (2022.01)
*G06N 3/08* (2006.01)

(52) U.S. Cl.
CPC .......... *G06T 7/0012* (2013.01); *G06K 9/4676* (2013.01); *G06K 9/6232* (2013.01); *G06K 9/6262* (2013.01); *G06K 9/6267* (2013.01); *G06N 3/084* (2013.01); *G06T 2207/20081* (2013.01); *G06T 2207/20084* (2013.01); *G06T 2207/20164* (2013.01); *G06T 2211/421* (2013.01)

(58) Field of Classification Search
CPC .................................................. G06K 9/4671
See application file for complete search history.

(56) References Cited

U.S. PATENT DOCUMENTS

| | | | |
|---|---|---|---|
| 2007/0286499 A1* | 12/2007 | Freiburg | G06K 9/325 382/229 |
| 2017/0046590 A1* | 2/2017 | Alpert | G06K 9/4623 |
| 2017/0132472 A1* | 5/2017 | Tao | G06N 3/08 |
| 2017/0270653 A1* | 9/2017 | Garnavi | G06N 20/20 |

(Continued)

OTHER PUBLICATIONS

Zhao, Guannan, et al. "Respond-cam: Analyzing deep models for 3d imaging data by visualizations." International Conference on Medical Image Computing and Computer-Assisted Intervention. Springer, Cham, 2018.

(Continued)

*Primary Examiner* — Hadi Akhavannik

(57) ABSTRACT

For saliency mapping, a machine-learned classifier is used to classify input data. A perturbation encoder is trained and/or applied for saliency mapping of the machine-learned classifier. The training and/or application (testing) of the perturbation encoder uses less than all feature maps of the machine-learned classifier, such as selecting different feature maps of different hidden layers in a multiscale approach. The subset used is selected based on gradients from back-projection. The training of the perturbation encoder may be unsupervised, such as using an entropy score, or semi-supervised, such as using the entropy score and a difference of a perturbation mask from a ground truth segmentation.

20 Claims, 4 Drawing Sheets

(56) References Cited

U.S. PATENT DOCUMENTS

2017/0337682 A1* 11/2017 Liao .................. G06T 7/30

OTHER PUBLICATIONS

Simonyan, Karen, Andrea Vedaldi, and Andrew Zisserman. "Deep inside convolutional networks: Visualising image classification models and saliency maps." arXiv preprint arXiv:1312.6034 (2013).
Fong, Ruth C., and Andrea Vedaldi. "Interpretable explanations of black boxes by meaningful perturbation." Proceedings of the IEEE International Conference on Computer Vision. 2017.
Selvaraju, Ramprasaath R., et al. "Grad-cam: Visual explanations from deep networks via gradient-based localization." Proceedings of the IEEE International Conference on Computer Vision. 2017.
Zolna, Konrad, Krzysztof J. Geras, and Kyunghyun Cho. "Classifier-agnostic saliency map extraction." Proceedings of the AAAI Conference on Artificial Intelligence. vol. 33. 2019.

* cited by examiner

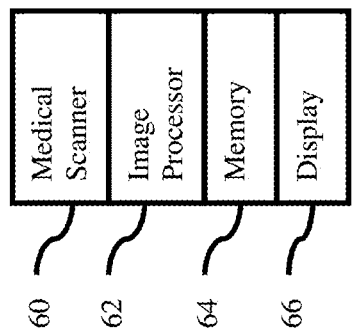

SALIENCY MAPPING BY FEATURE REDUCTION AND PERTURBATION MODELING IN MEDICAL IMAGING

BACKGROUND

The present embodiments relate to saliency mapping for machine-learned classification. Machine-learned classification provides useful information for image interpretation. The lack of interpretability and explainability of deep learning network results hinders building trustable intelligent systems. Interpretability is particularly important in medical applications to build trustable and transparent models. The output classification provides little information about how and why the machine-learned classifier predicted a given class. Such information would be useful to make sense of classification to clinicians and physicians for making clinical decisions.

A saliency map shows important areas of the input on which deep networks are focused to extract features and make predictions. The saliency map is useful for establishing appropriate trust and confidence of deep networks. A reliable prediction with a saliency map highlighting clinically relevant features may help make healthcare providers more efficient and confident, enhancing patient care, empowering patients with more information, and cutting costs.

The main methods for extracting a saliency map from deep machine-learned networks are gradient-based and perturbation-based. In gradient-based methods, partial derivatives of predicted class scores with respect to input pixel are utilized to visualize important pixels with an assumption that changes in intensities of important pixels have the most impact on the network prediction. One approach computes saliency response corresponding to gradient of class score logit with respect to feature map of the last convolutional layer. Another approach makes modification to reflect the responsiveness of corresponding feature maps. Perturbation-based methods distort the input image locally and select important areas by analyzing the impact of local perturbation on the class score. A learning framework may be used to model perturbation patterns for highlighting important regions and explaining the behavior of deep networks. Both gradient- and perturbation-based methods are time and process consuming.

SUMMARY

By way of introduction, the preferred embodiments described below include methods, systems, and instructions in non-transitory computer readable media for saliency mapping. A machine-learned classifier is used to classify input data. A perturbation encoder is trained and/or applied for saliency mapping of the machine-learned classifier. The training and/or application (testing) of the perturbation encoder uses less than all feature maps of the machine-learned classifier, such as selecting different feature maps of different hidden layers in a multiscale approach. The subset used is selected based on gradients from back-projection. The training of the perturbation encoder may be unsupervised, such as using an entropy score, or semi-supervised, such as using the entropy score and a difference of a perturbation mask from a ground truth segmentation.

In a first aspect, a method is provided for saliency mapping in a medical imaging system. The medical imaging system generates an image of a patient. The image is classified with a machine-learned classifier. The classifying with the machine-learned classifier determines values for a plurality of features of the machine-learned classifier in outputting a class membership of the image. Only a subset of the features is selected. A saliency map of the image is formed from input of the values for only the subset of the features to a machine-learned model. The class membership and the saliency map are displayed.

In one embodiment, the selection uses back-propagation from the classifying by the machine-learned classifier. The subset is selected from results of the back-propagation. For example, the features have the largest gradient from the back-propagation are selected as the most class sensitive. The largest average gradient or other statistic of the gradients for each feature may be used.

The selection may be multi-scale. One or more features are selected for each of multiple different hidden layers of the machine-learned classifier. The selection for each hidden layer is separate from the selections for other hidden layers.

Where the machine-learned classifier is a convolutional neural network, the selected features are convolutions of the convolutional neural network.

The machine-learned model may be a fully convolutional network. In one embodiment, the machine-learned model may be a machine-trained perturbation encoder.

In a further advantageous embodiment, the machine-learned model was trained in a semi-supervised manner with a score function based on a difference between a ground truth segmentation and an estimated perturbation mask with or without an entropy term depending on the amount of ground truth segmentation. If there are plenty of ground truth segmentation, the entropy term may be less important. Unsupervised training without the difference term (i.e., without the term based on the ground truth segmentation) may be used.

In a second aspect, a method is provided for machine training saliency map prediction of a machine-learned classifier. The machine-learned classifier classifies an input image. Back-propagation is performed from a class of the classifying. The back-propagating provides gradients with respect to feature maps of the machine-learned classifier as applied for the classification. Less than all of the feature maps are selected based on sensitivities of the feature maps to the class. A perturbation mask is generated by input of the selected features maps to a perturbation encoder. A perturbed input formed by combining the perturbation mask with the input image is input to the machine-learned classifier. The input results in a distorted class prediction by the machine-learned classifier. A score is computed from the distorted class prediction. The perturbation encoder is altered as part of training to minimize the score.

In one embodiment, the selection is performed separately for each of a plurality of hidden layers of the machine-learned classifier. The selection may be based on averages of the gradients for the different feature maps.

The combining of the input may be combining as a Hadamard product. The score may be computed from the distorted class prediction and from a difference of the perturbation mask and a ground truth segmentation.

The machine-learned classifier may be a convolutional neural network where the feature maps correspond to convolution kernels. The perturbation encoder may be a fully connected neural network. The learned perturbation encoder may be stored for later application or testing.

In a third aspect, a system is provided for saliency map prediction. A medical imaging scanner is configured to generate data representing a patient. An image processor is configured to classify the data by application of a machine-learned model and to generating a saliency map for the classification by application of input based on gradients from back-propagation of the classification to a perturbation encoder. The perturbation encoder was machine trained in a semi-supervised manner based on entropy and a difference of saliency from ground truth segmentations. A display is configured to display the classification and the saliency map for the patient.

In one embodiment, the image processor is configured to select a sub-set of feature maps using the gradients. The input is the selected feature maps.

In another embodiment, the perturbation encoder was trained with a score function including the entropy and the difference.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 6 is a block diagram of one embodiment of a system for saliency map generation.

DETAILED DESCRIPTION OF THE DRAWINGS AND PRESENTLY PREFERRED EMBODIMENTS

Saliency mapping uses feature map reduction and perturbation modeling. For feature map reduction, class-sensitive feature maps are selected based on backpropagation and feature importance computation for robust and efficient perturbation modeling. Unsupervised training may be used for machine learning the perturbation model. Semi-supervised training utilizing ground truth segmentation masks for regularizing the perturbation mask during the encoder training may be used.

By utilizing only class-sensitive feature maps, perturbation patterns, that are more relevant and sensitive to network prediction, may be learned. The learning process may be more efficient due to the reduced number of feature maps. Saliency responses may be estimated in a multiscale approach due to extraction of feature maps from different hidden layers (e.g., from deep and shallow layers) rather than from only the last single convolutional layer. In a convolutional neural network, each convolutional layer has different receptive field and level of feature representations. Thus, multiscale saliency modeling may better reflect network behavior for basing network prediction. In addition, the saliency response may be modeled directly on input space, which may provide more localized saliency and lead to more robust saliency maps more properly aligned to input space.

The robustness of saliency response may be further improved by regularizing with ground truth segmentation to penalize perturbation masks that are different from true pathological shapes and locations. By providing more clinically relevant saliency maps for deep learning networks in medical image analysis, the understanding of network decisions in machine-learned classification may be improved. The saliency map may result in gaining trust from clinicians and physicians. Robust saliency map estimation may also be valuable in identifying learned features that are not clinically relevant to a given diagnostic task. The debugging, design, or modification of machine-learned classification may benefit from this knowledge.

Figure 1:
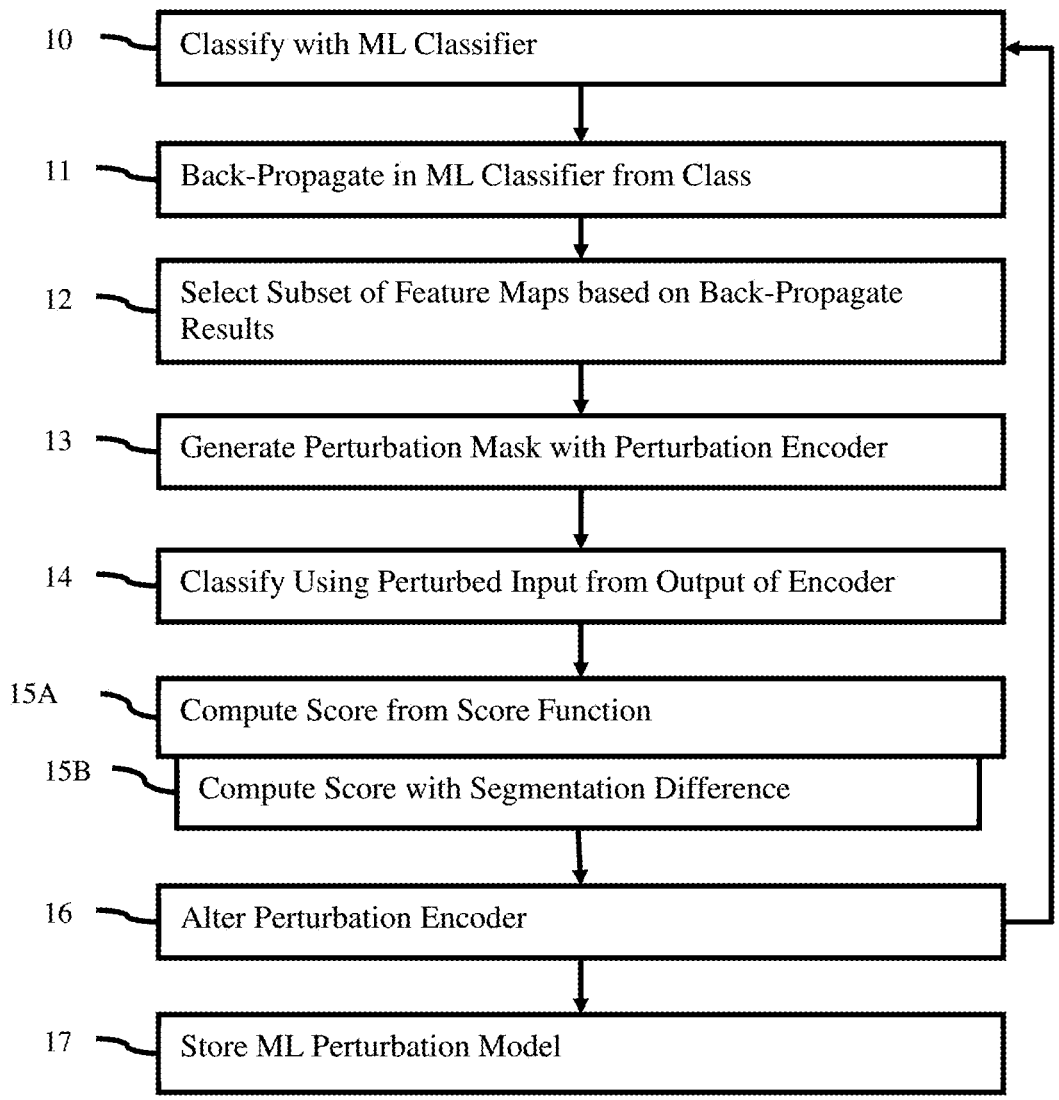
FIG. 1 is a flow chart diagram of one embodiment of a method for training for saliency mapping.

FIG. 1 shows a flow chart of one embodiment of a method for machine training saliency map prediction of a machine-learned classifier. A perturbation encoder is machine trained to estimate the saliency of different parts of input information to the resulting classification by the machine-learned classifier. The training of the perturbation encoder uses selection of some but not all feature maps of the machine-learned classifier and/or semi-supervised learning based on ground truth segmentation and entropy. To perform feature map reduction during the perturbation encoder training, a module is configured to back-propagate and then compute feature importance for each feature map. The extracted feature maps are subsequently used to generate a perturbation mask.

The method is performed by a computer, such as a server, workstation, or personal computer. In one embodiment for medical imaging, an image processor performs the acts in interaction with a memory and/or computer network. A memory may be used to store training data, the machine-learned classifier, and/or the machine-learned perturbation encoder. Other devices may be used. By performing the training for saliency mapping with feature selection and/or in a semi-supervised manner, the machine-learned perturbation model may more accurately and/or more rapidly indicate the saliency, making the image processor perform better as compared to other saliency mapping approaches.

The method is performed in the order shown (top to bottom or numerical). Other orders may be used.

Figure 4:
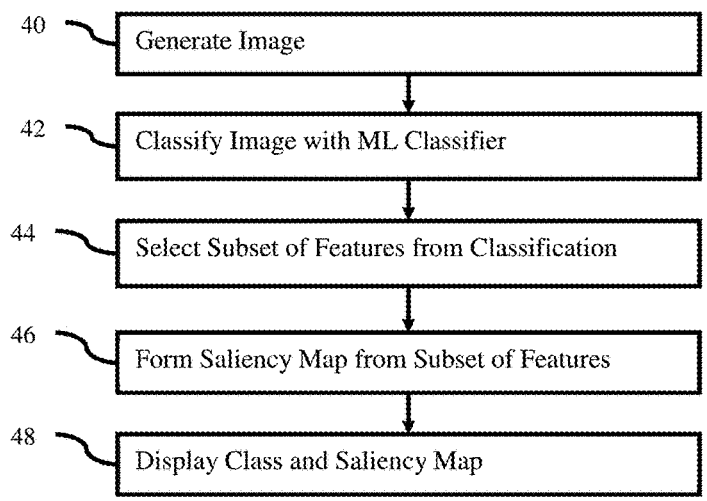
FIG. 4 is a flow chart diagram of one embodiment of a method for generating a saliency map.

Additional, different, or fewer acts may be used. For example, act 15B and/or act 12 are not performed. As another example, acts for application, such as described for FIG. 4, are performed.

Figure 2:
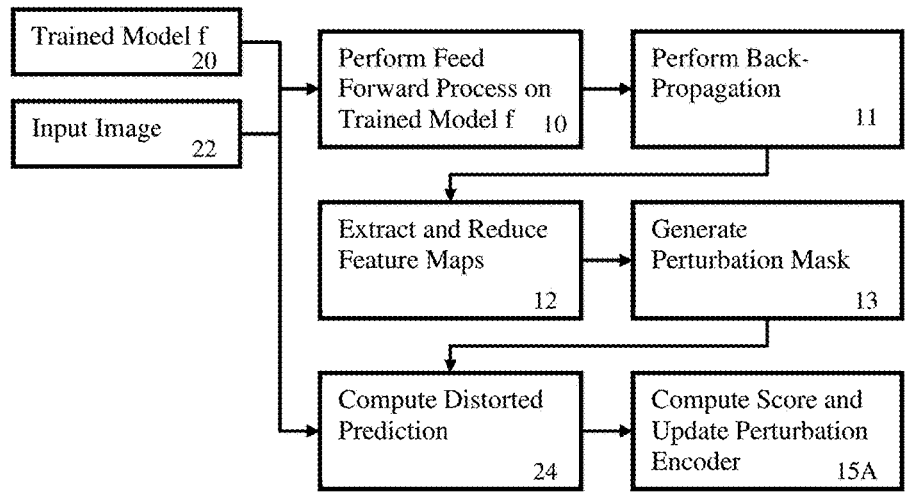
FIG. 2 illustrates one embodiment of an arrangement for machine learning to generate a saliency map.
Figure 3:
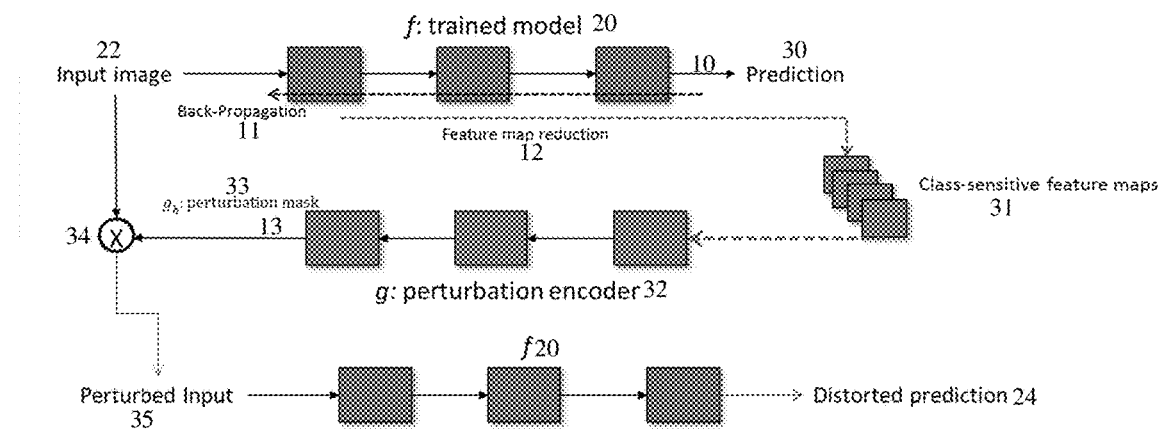
FIG. 3 illustrates another embodiment of an arrangement for machine learning to generate a saliency map.

FIGS. 2 and 3 illustrate various embodiments of the method of FIG. 1. FIG. 2 illustrates a training process for estimating saliency maps, and FIG. 3 illustrates a training architecture for perturbing input and updating the encoder to machine learn to generate a saliency map. FIGS. 1-3 show training of the perturbation encoder. FIGS. 2 and 3 will be described below in the context of the overall training of FIG. 1 but may be stand-alone embodiments.

The training of the machine-learned model for perturbation or saliency mapping uses many samples of input images 22. Over various iterations, the score computed in act 15A is minimized (or maximized depending on the score function). Any optimization may be used. The same sample input image 22 may be used for some of the iterations. Different sample input images 22 are used for different iterations. The perturbation encoder is trained based on passing the many samples through the machine training process. Acts 10-16 are described below for one of the iterations. The feedback from act 16 to act 10 represents repetition for other iterations in minimization as part of optimization in machine learning.

In act 10, an image processor classifies an input image or data. The input image is a medical image, such as computed tomography, magnetic resonance, ultrasound, x-ray, positron emission tomography (PET), single photon emission computed tomography (SPECT), or another medical image. The image represents a patient, such as representing an area or volume of the patient. The image is in a scan format or a display format (e.g., volume rendered image). In other embodiments, the image is non-medical, such as an image of a product or device. In alternative embodiments, other types of input information than an image is classified, such as measurements or other data.

The image processor classifies with a machine-learned classifier. Any now known or later developed machine-learned classifier may be used. For example, the machine-learned classifier is a neural network with previously learned values for learnable parameters (e.g., weights, kernels, or connections). In one embodiment, the machine-learned classifier is a convolutional neural network. Any number of layers of features (e.g., convolutional kernels) may be used, such as an input layer for the input image, an output layer for outputting the class, and one or more hidden layers in between the input and output layers. The layers include any number of nodes or activators, such as tens or hundreds of convolutional kernels in the input and/or hidden layers. Other architectures and/or types of machine-learned classifiers may be used, such as fully convolutional neural network, probabilistic boosting tree, or a support vector machine. Any semi-supervised or supervised learning may have been used to train the classifier. Hierarchal, cascade, or other approaches may be used.

The values for the learnable parameters were previously learned using deep learning or other machine learning. Hundreds or thousands of sample inputs and corresponding ground truth classifications are used to machine learn the values for the learnable parameters. Once learned, the machine-learned classifier may be applied to unseen input images. The previously trained classifier is used for machine training a different machine learning model for saliency mapping.

For classification and as shown in FIGS. 2 and 3, an input image 22 is input to the machine-learned classifier 20. In response, the machine-learned classifier outputs a classification or prediction 30 for the input image or data 22. The classification may be binary or may be probabilistic. The classes may be two or more classes, and a probability of class membership in each class may be output. To generate the class output, the input image or data 22 is feed-forwarded through the trained network. For example, the various weights, activations, convolution kernels, and/or connections are applied through the layers to generate the output. Each learnable parameter (e.g., convolution kernel) is a feature. The previously learned values of the features for the input image are determined to generate the output (e.g., learned feature weight of 0.7 of the feature applied to the pixel value by multiplication to determine the value of the feature).

In act 11, the image processor back-propagates from the class (i.e., classification or prediction 30) of the classification. The back-propagation uses the values of the features from the feed-forward process to determine the relevance of features for the input image of a given instance. In back-propagation, the gradients of the loss function with respect to the weights of the network for the single input-output instance are calculated. For example, the chain rule is used to iterate backwards one layer at a time from the output layer. In the convolutional neural network example, the back-propagation provides gradients with respect to feature maps (applied convolution kernels) of the machine-learned classifier. Using the output of the feed forward process, back-propagation is performed to obtain gradients of network output with respect to each hidden layer in the trained network. Gradients are determined for each feature, such as each convolution kernel.

In act 12, the image processor selects less than all of the features or feature maps. A subset of features is selected. The machine-learned classifier has a given number of features or feature maps. Some but not all of these features or feature maps are selected. Feature maps are used in the examples herein. In alternative embodiments, the selection is skipped (i.e., all the features maps are selected or used).

The selection is based on sensitivities of the feature maps to the class. The features maps having a larger or greater impact on the assignment of class are selected. Any measure of sensitivity may be used. In one embodiment, the gradients from back-propagation are used. For example, the features having a largest gradient are selected. As another example in a convolutional neural network, the gradients of each feature map are averaged. The feature maps with the largest average gradient are selected. In one embodiment, the feature importance for each feature map is computed by multiplying the gradients by feature activations (i.e., the gradients are multiplied by the values of the feature map from the feed-forward processing). The results of the multiplication are averaged, and the feature maps with the largest average are selected. Other statistics of the gradients may be used. Other information in addition to or as an alternative to gradients may be used, such as variance.

The selection is performed separately for different layers. The selection may be for only some or for all of the hidden layers. The input and/or output layer may be included. For more efficient usage of device memory and computational resources, target hidden layers may be specified in the trained model f to collect class-sensitive feature maps for training the perturbation encoder instead of utilizing every hidden layer.

For each layer, a given number of feature maps are selected. The same number or different numbers may be selected for different layers. To reduce the number of feature maps that are used for the perturbation encoder, a certain number of feature maps are selected for each target hidden layer based on the feature importance. The number of selected features may be set empirically or user selectable. Alternatively, the features from the different layers are grouped, and a given number of features is selected regardless of layers.

As shown in FIG. 3, the selection identifies a number of class-sensitive features or feature maps 31. These features or maps 31 are the features themselves (e.g., the trained values of the learnable parameters) or the features values resulting from application of the learned values to the input. In one embodiment, the features or feature maps are the values of the features as applied for the input image 22. In the convolutional example, the filtered values based on input on the input image 22 for each of the selected features are used. The feature values resulting from feed-forward processing or application of the feature maps are used.

In act 13, the image processor generates a perturbation mask. The perturbation encoder being trained is used, in a current instantiation during training, to generate a perturbation mask or a mask representing importance by spatial location of the input image to the classification. This perturbation mask is a saliency map.

As shown in FIG. 3, by input of the selected features maps 21 to the perturbation encoder 32, a perturbation mask 33 is output. The selected feature maps 31 are used as sample inputs to the perturbation encoder 32, which outputs the perturbation mask 33.

The perturbation encoder is a machine learning architecture with defined learnable parameters. Any now known or later developed architecture may be used. In one embodiment, an image-to-image architecture is used. Inputs representing spatial distributions of the feature maps 31 are used to generate a spatial distribution of the perturbation mask 33. For example, an encoder-decoder neural network is used. As another example, a U-Net architecture is used. A fully connected neural network may be used. Other machine learning architectures may be used.

The perturbation mask 33 is a pixel-by-pixel or voxel-by-voxel weighting for the input image 22. The weights may be binary. Alternatively, the weights have a linear or non-linear mapping, such as being from 0 to 1 in any increment (e.g., 0.1 for ten steps or 0.01 for one hundred steps). In other embodiments, the weights are by patch, such as provide a local weight for each of multiple location patches. The perturbation mask 33 indicates the saliency, such as for reducing contribution by less important locations and/or increasing contribution for more important locations in the classification.

The perturbation encoder 32 is trained to indicate the salient locations based on input of feature values for selected class-sensitive feature maps. For a neural network, a machine (e.g., image processor) performs deep learning. The input to the encoder 32 to generate the output mask 33 is used as part of the deep learning. Due to repetitions through acts 10-16, the values of learnable features of the perturbation encoder (e.g., values of the convolution kernels, weights, and/or connections) are learned.

For deep learning, the features of the input data to extract from the training data is learned. The training relates the input data to the output mask through one or more layers. One or more layers relate feature values to the output. For deep-learned networks, there may be further layers creating further abstract features from outputs of pervious layers. The resulting machine-trained model is a matrix for inputs, convolution kernels, down-sampling, weighting, and/or combination to output the mask. During training, a current instantiation of the perturbation encoder 32 is used to output the mask 33, where the current instantiation is based on the current values of the learnable parameters, which are applied to the input data or feature values derived from the input data. Any initialization of values of the learnable parameters may be used, such as random or based on a partially trained or other model.

In act 14, the image processor classifies based on a distorted input. The mask 33 output by the perturbation encoder 32 is used to create a distorted or perturbed input. The perturbation mask 33 is combined with the input image 22 to form a perturbed input 35. The combination is by multiplication, such as weighting the input image 22 pixel-by-pixel or voxel-by-voxel by the mask 33. In one embodiment, the combination is a Hadamard product. Other combination functions, such as sum or linear or non-linear mapping, may be used.

This perturbed input 35 is input to the machine-learned classifier 20. The perturbed input 35 is feed-forwarded in the trained network 20 to obtain the distorted prediction 24. The machine-learned classifier 20 outputs a distorted class prediction 24. In training the perturbation encoder 32, many such distorted class predications 24 are provided for computing scores from a score function.

In act 15A, the image processor computes a score from the distorted class prediction 24. A score function is used in unsupervised training. Rather than relying on difference from ground truth, the score function is used as a measurement of sufficiency or accuracy. The goal in training is to minimize or maximize the score where the score indicates the quality of the predicted output (i.e., the accuracy of the classification). Rather than using a ground truth or known classification for the sample input image, scoring is used.

In one embodiment, the score function is a measure of entropy. Any measure of entropy may be used. FIG. 3 shows one example where the score function, S, is a function of the current generative mask, gh, and the distorted output prediction 24, f', of classification. For example, a gradient of entropy from the mask to the prediction is used. Other score functions, such as a level of noise in a class prediction or variance, confusion, or meaningfulness of the machine-learned classifier prediction, may be used.

In another embodiment, a saliency regularization term, such as L1-norm, is included in the score function, S, to encourage most of the perturbation mask 33 to be turned off. This regularization may prevent highlighting entire regions of input and may also lead to finding a more informative region for the trained network.

Semi-supervised training may be used. The score function may include information from a ground truth. The image processor computes from the distorted class prediction 24 in act 15A and from a difference of the perturbation mask 33 and a ground truth segmentation in act 15B. If ground truth segmentation masks that highlight important areas (e.g., locations of lesion, infarct, or other expected important or distinguishing features of class in the brain) are available, it is possible to improve the saliency map by adding an L2-norm term to the score function, S, to minimize the difference between the estimated perturbation masks 33 and the ground truth segmentation masks during the training of the perturbation encoder 32. Since the number of ground truth segmentation masks is typically limited, the perturbation encoder 32 may be trained in an unsupervised manner, and then trained further or refined as transfer learning with a smaller learning rate and early stopping before catastrophic forgetting starts, after the initial training from scratch is finished.

In act 16, the image processor alters the perturbation encoder 32. The value or values of one or more learnable parameters are altered as part of machine learning.

Which learnable parameters and/or by how much to alter may be determined as part of optimization. The optimization is to minimize the score. By minimizing the score function, the model parameters of the perturbation encoder 32 are updated during training. The encoder 32 is trained until the score function converges.

Any optimization to minimize or maximize the score may be used. For example, using a piecewise-differentiable function or other deep learning function, the machine trains a network. The machine trains the network through regression. For example, the network is trained with a batch size of 20 and the Adam optimizer with a learning rate of 10-4 to minimize the score. FIG. 3 shows an example where the model parameters, $\theta_g$, of the perturbation encoder, g, for a next iteration, k, from a current iteration, k−1, are based on the model parameters of the current iteration, $\theta_{g(k-1)}$, with a learning rate, γ, using a gradient, $\nabla_{\theta_g}$, of the learnable parameter values for the score, S. Other training functions and optimizations may be used, such as using an L1-norm.

To improve the generalizability and robustness of the perturbation modeling, Monte-Carlo (MC) dropout may be applied in optimization to approximate posterior distribution of the trained model f at every epoch during the encoder training.

In training the perturbation encoder 32, acts 10-16 are repeated for different samples and/or the same samples with different values of the learnable parameters. Once the score converges or other iteration stop criterion (e.g., number of iterations) is met, the perturbation encoder 32 is trained.

In act 17, the image processor, using a memory, stores the machine-learned perturbation encoder 32. After creation, the machine-learned network includes one or more layers with values for various parameters, such as convolution kernels, weights, and/or connections. The values of the learnable parameters and/or the networks as trained are stored.

The machine-learned network is stored in a memory, such as memory of the machine or the database with the examples. The perturbation encoder 32 is stored with or separately from the machine-learned classifier 20. The machine-learned networks 20, 32 may be transmitted to a different memory. The machine-learned networks 20, 32 may be duplicated for application by other devices or machines, such as processors of medical scanners. The memories of medical scanners may store copies of the machine-learned networks for application for specific patients, assisting a radiologist or other physician in classification (e.g., diagnosis of disease state, whether an abnormality exists, or type of disease) as well as the saliency of different parts of the input image to the determination of the class. In other embodiments, the machine-learned networks 20, 32 are stored for use in refining the machine-learned classifier 20.

Figure 5:
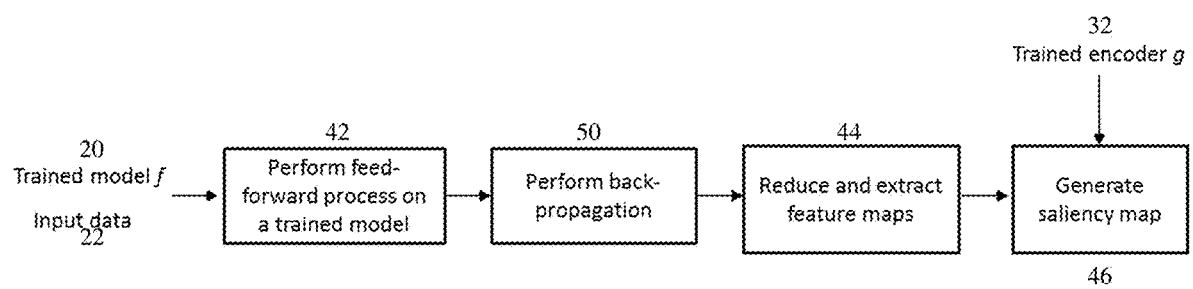
FIG. 5 illustrates one embodiment of saliency map generation.

Once the perturbation encoder 32 is trained, a saliency map may be predicted on any input data at testing time as illustrated in FIGS. 4 and 5. FIG. 4 shows a flow chart for one embodiment of a method for saliency mapping in a medical imaging system. The perturbation encoder 32, which may model saliency at multiscale by combining class-sensitive feature maps from different convolutional layers, maps saliency directly on the input space. Where the input space is the imaging space, the perturbation mask output by the encoder 32 for a given input image of a patient may be applied to the input image, indicating the saliency of different locations in the input image to the classification.

FIG. 5 illustrates another embodiment of the method of FIG. 4. FIG. 5 shows an example of a saliency map estimation procedure at testing time. Once the encoder 32 is trained, the saliency map can be predicted on any input data at testing time.

The methods are implemented by a machine, such as an image processor (e.g., a computer, workstation, server, or another processing component) or a medical scanner. For example, the system of FIG. 6 performs the acts using a memory and/or display device. In one embodiment, a medical scanner performs act 40. An image processor, such as part of the medical scanner or part of a workstation, performs acts 42-46. The image processor, in conjunction with a display of the MR scanner performs act 48. Other devices may perform any of the acts.

The acts are performed in the order shown (numeric or top-to-bottom), but other orders may be used. Additional, fewer, or different acts may be provided. For example, act 48 is not performed, such as where class and saliency are output to a computerized medical record of the patient for storage.

In act 40, a medical imaging system generates a representation of a patient. The representation is an image of the patient. The medical image is acquired by the medical scanner. The image is made available by or within the medical scanner. Alternatively, the image is generated by acquisition from storage or memory. A processor may extract the data from a picture archive communications system (PACS) or a medical records database. Acquisition may be through transmission over a network.

The image is medical imaging data. The medical image is a frame of data representing a plane or volume of the patient. The data may be in any format. While the terms image and imaging are used, the image or imaging data may be in a format prior to actual display of an image. For example, the medical image may be a plurality of scalar values representing different locations in a Cartesian, radial, spiral, or polar coordinate format different than a display format. The image or imaging is a dataset that may be used for imaging, such as scan data representing the patient, data that may be used on a display screen, or data that is displayed.

The image is acquired by scanning the patient. The image represents the patient. The medical image represents tissue and/or bone structure of the patient. Alternatively, the medical image represents flow, velocity, or fluids within the patient. In other embodiments, the medical image represents both flow and structure.

In act 42, an image processor classifies the input image 22 with the machine-learned classifier 20. The machine-learned classifier 20 determines values for a plurality of features of the machine-learned classifier 20 in outputting a class membership of the input image 22. For example, the filtered outputs from convolutions in one or more hidden layers are determined in order to feed-forward to an output classification. Rather than using manually programmed features (e.g., Haar wavelets), the features from a machine-learned regressor network are used. The values of the features for a given image are output in response to application of the image to the input of the machine-learned regressor network. The part or layers of a neural network (e.g., convolutional neural network) that learn features are used. The neural network is a deep learned network that includes learned features.

The machine-learned classifier is applied. In this testing phase, the previously learned values for the learnable parameters are used to determine the class of current input data 22. The input data 22 is the same or different than any of the training samples, such as being a previously unseen input. As represented in FIG. 5, the input image or data 22 is input to the trained model 20, which is used to perform feed-forward processing to output the classification.

In act 44, the image processor selects only a subset of the features from application of the machine-learned classifier. The class-sensitive features are selected. The same or different selection process used in training is used in application. Since the perturbation encoder is trained to generate the saliency map (i.e., mask 33) from a subset of features in one embodiment, a subset of features is selected during application.

As shown in FIG. 5, the feature selection uses back-propagation 50. Back-propagation of the classification by the machine-learned classifier 20 for application to the input data 22 for this specific patient is performed. The results of the back-propagation are used to select the features, such as selecting features having a largest gradient or largest average gradient. For example, the gradients for different convolution activations are averaged, and the convolution activations with the largest average gradients are selected.

The selection is performed for one or more target layers of the machine-learned classifier 20. For example, the selection is multiscale so that features are independently or separately selected for each of two or more layers, such as two or more hidden layers, of the machine-learned network. Less than all the features for one or more layers are selected.

In act 46, the image processor generates a saliency map for the classification output from act 42. The saliency map of the input is formed from input of the values for only the subset of the features to a machine-learned model. For example, the selected feature maps and/or values for the feature maps for a given application (i.e., values resulting from the learned values applied to the data input to the feature) are input to generate the saliency map.

A machine-learned model generates the saliency map. For example, the values of the selected feature maps resulting from the feed-forward classification are input to the machine-trained perturbation encoder 32, which may be a fully convolutional or another network. In response, the perturbation encoder 32 outputs the saliency map as a mask 33.

Due to the unsupervised or semi-supervised training, the machine-learned model has different values for the learned parameters than may otherwise be used. In application, these different values result in different values for the features, such as the feature maps. Due to application of the machine-learned model, the output is provided in a more rapid manner and is defined or results from the type of training used. Different training may result in different output during application. The image processor performs differently due to the previous training.

The output saliency map is a weighting by location in the input image space of the saliency or importance of each location to the classification. The saliency map has scalar values that vary by location.

In act 48, the image processor, using a display, displays the class membership and the saliency map. Both the class membership and the saliency map are displayed at a same time (i.e., on the screen simultaneously) but may be displayed sequentially or separately. The class and saliency may be displayed with a display image of the patient, such as from the medical scan. In one embodiment, the class membership is indicated as an annotation of an image representing tissue of the patient (i.e., on a medical image). The saliency map is generated separately, such as on a different part of the same screen. Alternatively, the saliency map is overlaid, such as a color or highlighting overlay, on the medical image.

The class membership is displayed as alphanumeric text. Alternatively, the class membership is indicated by color coding or a symbol.

The saliency map is displayed as a two-dimensional distribution or a volume rendering to two dimensions of saliency information distributed in three dimensions. The saliency may be represented by color or grayscale, such as mapping scalar values indicating relative contribution to classification to display (e.g., RGB) values. In one embodiment, the saliency map is mapped based on a threshold, such as where saliency above the threshold is used to tint or highlight a medical image and saliency below the threshold is not used to tint or highlight. In other embodiments, the saliency is used to weight the input image. The image of patient tissue, as weighted by saliency, is displayed. Other displays of the saliency map alone or in combination with image data may be used.

FIG. 6 shows one embodiment of a system for saliency map prediction. The system is for machine learning and/or for application of a machine-learned networks. The system is implemented on the medical scanner 60, but one or both machine-learned networks may be implemented on a server, computer, and/or workstation separate from the medical scanner 60.

The system includes the medical scanner 60, an image processor 62, a memory 64, and a display 66. Additional, different, or fewer components may be provided. For example, network connections or interfaces are provided, such as for networking with a medical imaging network or data archival system. In another example, a user interface is provided. As another example, a server and database are provided for training and/or implementing one or both trained networks.

The image processor 62, memory 64, and display 66 are part of the medical scanner 60. Alternatively, the image processor 62, memory 64, and display 66 are part of an archival and/or image processing system, such as associated with a medical records database workstation or server, separate from the medical scanner 60. In other embodiments, the image processor 62, memory 64, and display 66 are a personal computer, such as desktop or laptop, a workstation, or combinations thereof. The image processor 62, display 66, and memory 64 may be provided without other components for acquiring data by scanning a patient.

The medical scanner 60 is a medical diagnostic imaging system. For example, the medical scanner 60 is a magnetic resonance, computed tomography, x-ray, ultrasound, PET, or SPECT imaging system. The medical scanner 60 is configured, such as by settings, to generate data representing a patient, such as image data in the object domain. The patient is scanned and/or emissions from the patient are detected. The measurements are then used as image or scan data or further processed (e.g., reconstructed and/or filtered) to form image or scan data.

The image processor 62 is a general processor, central processing unit, control processor, graphics processor, neural processing unit, artificial intelligence processor, digital signal processor, three-dimensional rendering processor, application specific integrated circuit, field programmable gate array, digital circuit, analog circuit, combinations thereof, or other now known or later developed device for machine training or applying a machine-learned network. The image processor 62 is a single device or multiple devices operating in serial, parallel, or separately. The image processor 62 may be a main processor of a computer, such as a laptop or desktop computer, or may be a processor for handling some tasks in a larger system, such as in the medical scanner 60. The image processor 62 is configured by instructions, design, hardware, and/or software to perform the acts discussed herein.

The image processor 62 is configured to perform the acts discussed above for training and/or application. For training, the image processor 62 or another processor (e.g., a server) applies a machine-learned classifier, back-propagates, selects feature maps, applies the perturbation encoder being trained to generate a mask, perturbs the input with the mask, applies the perturbed input to the machine-learned classifier, calculates a score from output of the perturbed class, and optimizes through the training iterations. The image processor 62 uses deep machine learning based on the stored and/or created training data and a defined network architecture. The image processor 62 learns the values of learnable parameters for the machine-learned model for generating the mask or saliency map. Unsupervised or semi-supervised machine learning is implemented.

For application, the image processor 62 is configured to classify the input data by application of a machine-learned model, such as a machine-learned classifier or another model. The machine-learned model is applied to generate a classification or determine group membership. The image processor 62 is configured to generate a saliency map. In one embodiment, the saliency map is generated by selecting a sub-set of feature maps using gradients from back propagation of the classification. The selected feature maps, such as the values of the feature resulting from application or feed-forward processing of the machine-learned model, are input to a perturbation encoder. The perturbation encoder is a machine-learned model for generating a mask or saliency map. Unsupervised using a cost function or semi-supervised using a cost function including a term based on difference from ground truth were used to train the perturbation encoder. The cost function may include various terms, such as a measure of entropy. Upon application of the trained perturbation encoder to the values for the selected feature maps, the perturbation encoder implemented by the image processor 62 outputs the saliency map for classification for that patient.

The image processor 62 is configured to transmit the class and/or saliency map over a network, to the display 66, or to the memory 64. The image processor 62 may be configured to generate a user interface for presenting the classification and/or saliency map to a user or operator.

The memory 64 may be a graphics processing memory, a video random access memory, a random-access memory, system memory, cache memory, hard drive, optical media, magnetic media, flash drive, buffer, database, combinations thereof, or other now known or later developed memory device for storing data or video information. The memory 64 is part of the medical scanner 60, part of a computer associated with the image processor 62, part of a database, part of another system, a picture archival memory, or a standalone device.

The memory 64 stores medical imaging data representing the patient (e.g., input image), other input data, weights or values of learnable parameters making up the layers of the machine-learned networks, masks, saliency maps, values of features or feature maps, gradients, average gradients, thresholds, outputs from different layers, one or more machine-learned networks, images, class, and/or other information used in training and/or application. The memory 64 may store data during processing for application and/or may store training data and data during processing for machine learning.

The memory 64 or other memory is alternatively or additionally a non-transitory computer readable storage medium storing data representing instructions executable by the programmed image processor 62 for training or use of machine-learned networks in medical imaging. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The display 66 is a monitor, LCD, projector, plasma display, CRT, printer, or other now known or later developed device for outputting visual information. The display 66 receives images, graphics, text, quantities, or other information from the image processor 62, memory 64, medical scanner 60, and/or a server. One or more medical images are displayed. The images are of a region of the patient. The image includes an indication, such as a text (annotation), graphic or colorization, of the classification results. The classification may be displayed as the image without a medical image of the patient. The saliency map is displayed as an overlay or highlighting of the image of the patient. Alternatively, the saliency map is displayed in a different region of the screen. In yet other alternatives, the saliency map weights the medical image so that the displayed medical image includes saliency information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for saliency mapping in a medical imaging system, the method comprising:
   generating, by the medical imaging system, an image of a patient;
   classifying the image with a machine-learned classifier, the classifying with the machine-learned classifier determining values for a plurality of features of the machine-learned classifier in outputting a class membership of the image;
   selecting less than all features of the plurality of features of the machine-learned classifier based on the determined values to form a subset of the features;
   forming a saliency map of the image from input of the determined values for only the subset of the features to a machine-learned model; and
   displaying the class membership and the saliency map.

2. The method of claim 1 wherein selecting comprises performing back-propagation from the classifying by the machine-learned classifier and selecting the subset from results of the back-propagation.

3. The method of claim 2 wherein selecting comprises selecting the features having a largest gradient from the back-propagation.

4. The method of claim 3 wherein selecting comprises selecting with the largest gradient comprising a largest average gradient.

5. The method of claim 1 wherein selecting comprises separately selecting for different hidden layers of the machine-learned classifier.

6. The method of claim 1 wherein the machine-learned classifier comprises a convolutional neural network, and wherein selecting the subset comprises selecting convolutions of the convolutional neural network.

7. The method of claim 1 wherein forming comprises outputting from the machine-learned model comprising a fully convolutional network.

8. The method of claim 1 wherein forming comprises forming by the machine-learned model comprising a machine-trained perturbation encoder.

9. The method of claim 1 wherein forming comprises forming by the machine-learned model, the machine-learned model having been trained in a semi-supervised manner with a score function based on a difference between a ground truth segmentation and an estimated perturbation.

10. The method of claim 1 wherein selecting comprises selecting the subset as class sensitive features.

11. A method for machine training saliency map prediction of a machine-learned classifier, the method comprising:
classifying an input image by the machine-learned classifier;
back-propagating from a class of the classifying, the back-propagating providing gradients with respect to feature maps of the machine-learned classifier;
selecting less than all of the feature maps based on sensitivities of the feature maps to the class;
generating a perturbation mask by input of the selected features maps to a perturbation encoder;
inputting a perturbed input formed by combining the perturbation mask with the input image to the machine-learned classifier, the inputting resulting in a distorted class prediction;
computing a score from the distorted class prediction; and
altering the perturbation encoder to minimize the score.

12. The method of claim 11 wherein selecting comprises selecting separately for each of a plurality of hidden layers of the machine-learned classifier.

13. The method of claim 11 wherein the combining of the inputting comprises combining as a Hadamard product.

14. The method of claim 11 wherein selecting comprises selecting from averages of the gradients for the different feature maps.

15. The method of claim 11 further comprising storing the perturbation encoder.

16. The method of claim 11 wherein classifying comprises classifying by the machine-learned classifier comprising a convolutional neural network, the feature maps corresponding to convolution kernels, and wherein generating comprises generating by the perturbation encoder comprising a fully connected neural network.

17. The method of claim 11 wherein computing the score comprises computing from the distorted class prediction and from a difference of the perturbation mask and a ground truth segmentation.

18. A system for saliency map prediction, the system comprising:
a medical imaging scanner configured to generate data representing a patient;
an image processor configured to classify the data by application of a machine-learned model and to generate a saliency map for the classification by application of input based on gradients from back-propagation of the classification to a perturbation encoder, the perturbation encoder having been machine trained in a semi-supervised manner based on entropy and a difference of saliency from ground truth segmentations; and
a display configured to display the classification and the saliency map for the patient.

19. The system of claim 18 wherein the image processor is configured to select a sub-set of feature maps using the gradients, and wherein the input is the selected feature maps.

20. The system of claim 18 wherein the perturbation encoder was trained with a score function including the entropy and the difference.

* * * * *